United States Patent Office 3,709,805
Patented Jan. 9, 1973

3,709,805
PRODUCTION OF POLYMERS WITH A FIBROUS STRUCTURE
Carl Heinrich Krauch, Heidelberg, and Axel Sanner, Ludwigshafen (Rhine), Germany, assignors to Badische Anilin- & Soda-Fabrik Aktiengesellschaft, Ludwigshafen (Rhine), Germany
No Drawing. Filed July 16, 1968, Ser. No. 745,113
Claims priority, application Germany, July 22, 1967, P 17 20 286.7; Feb. 24, 1968, P 17 20 350.8; May 30, 1968, P 17 70 528.1, P 17 70 529.2; May 31, 1968, P 17 70 543.0; June 1, 1968, P 17 70 552.1
Int. Cl. B01j 1/00; C08d 1/00
U.S. Cl. 204—159.22
11 Claims

ABSTRACT OF THE DISCLOSURE

Polymers having a fibrous structure are obtained by the polymerization of solutions and/or emulsions or dispersions, fully or partially solidified in crystalline form, of ethylenically unsaturated monomers with at least two polymerizable double bonds or mixtures containing at least 0.01% by weight of these monomers and monoethylenically unsaturated monomers by irradiation, which polymers can be obtained in the form of novel porous materials (=poromeric materials) having properties similar to leather.

The invention relates to a process for the production of polymers having a fibrous structure, in which ethylenically unsaturated monomers are polymerized by irradiation.

It is known that ethylenically unsaturated monomers may be converted into polymers by irradiation. Sensitizers are frequently used in such processes and in general the processes are carried out at room temperature. The monomers are generally present in liquid form, that is in solution or as a liquid substance. It is also known to polymerize ethylenically unsaturated monomers, which are present in crystalline form, in bulk. Finally, it is known to carry out the polymerization of monoethylenically unsaturated monomers, such as acrylonitrile, acrylamide and vinyl pyrrolidone in solutions solidified in amorphous form, for example castor oil. Conventional polymers, which are generally present in the form of powders or gels, are obtained by using these known processes, which are summarized in Chapter 4 of the book "Actions Chimiques et Biologiques des Radiations," 10th Series, Masson & Cie, Editeurs, Paris, 1966. An exception is the polymerization of pure methacrylic acid crystals by UV-irradiation, in which there is formed within the same crystal in addition to the amorphous polymer a small amount of fibrous polymer (C. H. Bamford, A. D. Jenkins and J. C. Ward, J. Polym., 37, 48 (1966)). Furthermore, French Pat. 1,414,088 discloses a process for impregnating non-woven fabrics with aqueous polymer dispersions and cooling the impregnated non-woven fabrics to a temperature at which setting of the aqueous polymer dispersion within the fabric takes place. This results in the freeze-agglomeration of the polymer dispersions with fiber-like agglomerates being formed from the polymers.

The object of the present invention is to produce polmers having a fibrous structure by the direct polymerization of olefinically unsaturated monomers. A further object of this invention is to produce polymers with a fibrous structure arranged to form a porous, flat material. Further objects of the invention will be apparent to those skilled in the art from the following detailed description. These objects can be achieved by the present invention.

It has been found that polymers with a fibrous structure are obtained by polymerizing ethylenically unsaturated monomers in liquids which have been solidified by irradiation, by fully or partially solidifying in crystalline form solutions and/or emulsions or dispersions of monomers with at least 2 polymerizable double bonds or mixtures of such monomers and monoethylenically unsaturated monomers, which contain at least 0.01 and in particular at least 0.5% by weight of monomers with 2 polymerizable double bonds, irradiating the solidified mass and separating off the liquid. Surprisingly, with the new process, polymers having a fibrous structure are obtained. When monoethylenically unsaturated monomers such as styrene, acrylonitrile or acrylic esters in solutions solidified in crystalline form are polymerized alone by irradiation, non-structured and generally gel-like polymers and not polymers in fiber form are obtained.

For the new process nearly all polyethylenically unsaturated monomers can be used which contain at least two polymerizable double bonds. Suitable compounds are, for example, polyethylenically unsaturated carboxylic esters, e.g. diesters of aliphatic or cycloaliphatic diols with preferably 2 to 10, and preferably 2 to 6 C atoms, such as ethylene glycol, propylene glycol, 1,4-butanediol, 1,6-hexanediol and 1,4-cyclohexanediol and of monoethylenically unsaturated monocarboxylic acids, such as acrylic and methacrylic acids, e.g. ethyleneglycol diacrylate and methacrylate, 1,4-butanediol diacrylate, methacrylate and crotonate, 1,6-hexanediol diacrylate and 1,4-cyclohexanediol diacrylate, divinyl maleate, polyvinyl esters of polycarboxylic acids, in particular divinyl esters of aliphatic or aromatic dicarboxylic acids, in particular those containing from 4 to 8 C atoms and, if desired, one olefinic double bond, such as divinyl oxalate, divinyl fumarate, divinyl adipate and divinyl phthalate; vinyl esters of monoolefinically unsaturated monocarboxylic acids containing preferably 3 or 4 C atoms, such as vinyl methacrylate, vinyl crotonate and preferably vinyl acrylate, allyl carboxylic acid esters, in particular saturated or monoolefinically unsaturated dicarboxylic acids containing 3 to 8 C atoms, such as diallyl phthalate, allyl acrylate and methacrylate, diallyl maleate, diallyl oxalate, diallyl adipate, allyl-α-chloroacrylate and allyl-α-bromomethacrylate. Such unsaturated carboxylic acid esters generally have two or three olefinic double bonds and 5 to 20, and in particular 5 to 14 C atoms, and they may, if desired, be derived from substituted carboxylic acids, e.g. from halogenated carboxylic acids, in particular from monoethylenically unsaturated monocarboxylic acids substituted in the α-position by bromine or chlorine.

Suitable compounds are furthermore polyethylenically unsaturated hydrocarbons, such as butadiene, isoprene, 2,3-dimethylbutadiene and divinylbenzene, containing preferably from 4 to 10 C atoms.

Suitable polyethylenically unsaturated monomers are in addition polyethylenically unsaturated carboxylic acid amides, e.g. the diamides of acrylic or methacrylic acid and diamines, in particular diamines containing from 2 to 6 C atoms, such as N,N-ethylene-bis-acrylamide and methacrylamide and N,N-hexamethylene-bis-acrylamide, furthermore polyethylenically unsaturated derivatives of melamine, dicyandiamine, urea and guanidine, such as N,N-diallyl melamine, triallylisocyanurate, tetramethylolacetylenediurea-tetraallyl ether, N,N-hexamethylene-bis-allylurethane and N,N-xylylene-bis-allylurethane.

Suitable polyethylenically unsaturated compounds are furthermore polyethylenically unsaturated amines, such as N,N-diallylamine, and polyethylenically unsaturated heterocyclic compounds, such as 2,5-divinylpyridine, 1,3-divinylimidazole and 1,3-divinylcarbazole.

Particularly interesting polyethylenically unsaturated monomers containing at least 2 polymerizable double bonds are the so-called "unsaturated polyesters," which are customarily used in the production of the so-called unsaturated polyester resins and which are described, for example, in the book by P. Selden "Glasfaserverstärkte Kunststoffe," Springer-Verlag, 1967, pages 8 to 18. They generally have linear molecules with recurring ester groups in the chain, at least two polymerizable olefinic double bonds and molecular weights which are generally greater than 500 and frequently between 500 and 5000 or in some instances even higher, e.g. 8000. In manufacturing these polymers by the process described, for example, in the above-mentioned book by P. Selden, on pages 16 to 18, generally speaking equivalent or substantially equivalent amounts of aliphatic, cycloaliphatic or aromatic dicarboxylic acids, in particular $\alpha,\beta$-ethylenically unsaturated dicarboxylic acids, which generally contain from 4 to 6 C atoms, or anhydrides thereof with diols, in particular with aliphatic, cycloaliphatic or araliphatic diols, which generally contain from 4 to 6 C atoms, or anhydrides thereof with diols, in particular with aliphatic, cycloaliphatic or araliphatic diols, which generally contain from 2 to 22, and in particular from 2 to 12 C atoms and if desired ether oxygen atoms, are subjected to polycondensation. The unsaturated polyesters can also be condensed in smaller quantities, e.g. in amounts of 0.1 to 20% by weight with mono-, tri- or polybasic carboxylic acids and/or mono-, tri- or polyhydric alcohols in customary manner. The acid numbers of the appropriate unsaturated polyesters are generally between 5 and 100 and preferably between 5 and 60.

Suitable unsaturated polyesters are for example those of alkanediols, such as ethylene glycol, propylene glycol, 1,4-butanediol, alkenediols, such as 2-butene-1,4-diol, 3-butene-1,2-diol, ether oxygen containing alkane diols, such as diethylene glycol and triethylene glycol and/or furthermore neopentyl glycol, and $\alpha,\beta$-ethylenically unsaturated dicarboxylic acids, in particular maleic acid, and furthermore fumaric acid, itaconic acid, mesaconic acid, citraconic acid, dihydromuconic acid, $\alpha$-methyleneglutaric acid and endomethylenetetrahydrophthalic acid. Such unsaturated dicarboxylic acids are admixed with advantage with e.g. 25–75% by weight, based on the total dicarboxylic acid content, of dicarboxylic acids which do not contain copolymerizable double bonds, such as phthalic acid, dihydrophthalic acid, tetrahydrophthalic acid and adipic acid, in the production of the unsaturated polyester.

The amount of unsaturated polyesters can in general be between 2 and 100, and preferably between 5 and 40% by weight, based on the total monomer content. In addition to the unsaturated polyesters other monomers containing at least two double bonds may be admixed in desired amounts. It is advantageous for at least 5% by weight of the entire monomer content, the monomers containing at least two polymerizable double bonds, to be unsaturated polyesters. When the polyethylenically unsaturated monomers are unsaturated polyesters, polymers are obtained with a fibrous structure having very high fastness to rubbing and tensile strength.

It is particularly advantageous from the economic point of view in the case of the new process to admix monoethylenically unsaturated monomers with the polyethylenically unsaturated monomers. Suitable compounds for this purpose are in particular acrylic esters and/or methacrylic esters, in particular those of alkanols with 1 to 8, and in particular with 1 to 4 C atoms, e.g. the methyl, ethyl, n-butyl, isobutyl, n-hexyl, cyclohexyl and 2-ethylhexyl esters of acrylic and methacrylic acid, and furthermore acrylonitrile and methacrylonitrile, monoolefins, in particular with 1 to 10 C atoms, such as 1-butene, 1-heptene, cyclopentene and norbornene, monovinylaromatic compounds such as styrene, vinyltoluene and $\alpha$-methylstyrene, vinyl esters in particular those containing saturated aliphatic carboxylic acids with 3 to 18 C atoms, such as vinyl acetate, vinyl propionate, vinyl laurate and vinyl stearate, vinylidene halides, such as vinyl chloride, vinyl fluoride and vinylidene chloride, vinyl ethers, in particular of alkanols with 1 to 4 C atoms, such as methyl vinyl ether and isobutyl vinyl ether, heterocyclic monovinyl compounds, such as N-vinyl caprolactam, vinyl pyridine, N-vinyl imidazole, N-vinyl carbazole and N-vinyl pyrrolidone, furthermore in small amounts, in particular in amounts of 0.1 to 10% by weight, with regard to the total monomer content, monoethylenically unsaturated monocarboxylic acids, preferably with 3 to 4 C atoms and if desired substituted amides thereof, such as acrylic acid and methacrylic acid, acrylamide, methacrylamide, N-methylol acrylamide, N-methylolmethacrylacrylamide and alkyl ethers of such methylol compounds, e.g. methyl and butyl ethers, and vinylsulfonic acids and alkyl esters and hydroxyalkyl acrylates and methacrylates thereof, such as 1,4-butanediol monoacrylate, 2-hydroxyethyl acrylate, 3-chloro-2-hydroxypropyl acrylate, in particular those containing hydroxyalkylene radicals with 2 to 6 C atoms.

The ethylenically unsaturated monomers of the new process can also be materials which in addition to the polymerizable double bonds contain chromophoric groups. Such "colored monomers" are for example dyes of the azo, anthraquinone and diarylmethane series containing a polymerizable C—C double bond. A number of such dyes is for example described in German Pats. 1,052,016, 1,107,356 and 1,136,302, in Austrian Pat. 211,447, in French Pat. 1,118,705 and in Belgian Pats. 566,099 and 590,317. As examples there may be mentioned the coupling products of diazotized 1 - amino-3-acryloylaminobenzene with 1 - [N-($\beta$-hydroxyethyl)-N-($\beta$-cyanoethyl)-amino] - 3 - methylbenzene or of diazotized 1-acryloylamino-4-aminobenzene and 1 - hydroxynaphthaline-4-sulfonic acid, acryloylaminobenzene, 1-amino - 2 - acetyl-4-acryloylamino-anthraquinone. The amount of such "colored monomers" is generally between 10 and 0.01, and preferably between 5 and 0.5% by weight, based on the total monomer content. The photoinitiators and the sensitizing agents used generally affect the choice of the "colored monomers" must have an absorption minimum in the range of the absorption maximum of the sensitizing agents. When the spectra of the "colored monomers" and of the sensitizing agents overlap and when consequently photoimitation is unsuitable, the operation is advantageously carried out with ionizing radiation.

In the production of mixed polymers from monomers with at least two polymerizable double bonds and monomers with only one ethylenically unsaturated double bond, the ratio of the two monomeric substances can be varied within a wide range, but there must be present in the mixture at least 0.01 and in particular at least 0.5% by weight, based on the total monomer content, of monomers with at least two double bonds. The amount of monomer with at least two polymerizable double bonds. The amount of monomer with at least two polymerizable double bonds is preferably from 5 to 100% by weight, based on the total monomer content. As monomers with at least two double bonds, those with at least two polymerizable double bonds are preferred. Of particular importance are diunsaturated acrylic or methacrylic esters or ethylenically diunsaturated acrylic or methacrylic amide derivatives, as well as unsaturated polyesters.

Of the monoethylenically unsaturated monomers, acrylic and methacrylic esters, acrylonitrile and lower vinyl esters and N-vinyl compounds, such as N-vinyl caprolactam and N-vinylcarbamic acid esters are of particular interest. The monomers can in general contain the customary inhibitors for the thermal polymerization; generally speaking these do not have a deleterious effect on the process.

In carrying the new process into effect in general solvents or emulsions and dispersions of monomers in such liquids or solvents are prepared, which on cooling solidify in crystalline form. By partial "crystalline solidification" we understand the partial solidification of the solvent in crystalline form and not the crystallization of the monomer from the solutions without the simultaneous separation of solvent crystals. The monomer content of these solutions and emulsions or dispersions can vary within wide limits. Monomer solutions generally contain between 1 and 20, preferably between 2 and 10% by weight, based on the solution. When the monomers are used in emulsified or dispersed form, they are generally used in amounts between 0.1 and 20, and preferably between 0.5 and 10% by weight, based on the monomer emulsion or dispersion, but in special cases it can be higher than 20% by weight, e.g. 35% by weight. As liquids or solvents primarily those are used which undergo crystalline solidification in the range of +100 to −100° C., or preferably +25 to −25° C. Examples of these are acetic acid, dioxane, trioxane, benzene and in particular water.

When the monomers are used in the form for example of aqueous emulsions or dispersions, the customary emulsifying agents and if desired protective colloids can be used in the emulsions or dispersions. Such emulsifying agents are for example fully described in Houben-Weyl, "Methoden der Organischen Chemie," vol. XIV/1, Makromoleculare Stoffe, Georg Thieme Verlag, Stuttgart, 1961, in particular pages 192 to 208. Suitable compounds are for example anionic emulsifying agents, such as the alkali metal salts of fatty acids, the alkali metal salts of acid aliphatic alcohol-sulfuric acid esters, in particular sodium sulfonate, alkali metal and ammonium salts of alkyl and alkylarylsulfonic acids, salts of fatty acid condensation products with oxyalkylcarboxylic acids, aminoalkyl carboxylic acids and in particular alkali metal salts of sulfonated ethylene oxide adducts of aliphatic alcohols or alkylphenols, which for example contain 5 to 30, and in particular 8 to 20, ethylene oxide groups, as well as cationic emulsifying agents, such as salts of alkylamines, aryl, alkylaryl or resin amines and quaternary ammonium compounds, such as N-dodecyl-N-trimethylammonium chloride. Furthermore, there may be used non-ionic emulsifying agents, e.g. the reaction products of alkylene oxides, such as ethylene oxide, with aliphatic alcohols or alkyl phenols, whose alkyl groups preferably contain from 8 to 12 carbon atoms. Mixtures of emulsifying agents, for example mixtures of non-ionic and anionic emulsifying agents, may also be used for the process. The emulsifying agents of the type mentioned are generally present in an amount between 0.1 to 10% by weight, based on the total monomer content, and preferably in an amount between 0.1 and 5% by weight. In particular instances the process may also be carried out without the addition of an emulsifying agent.

When light initiators are used it is advantageous to add to the solutions, emulsions or dispersions, small quantities of photoinitiators, that is compounds which are decomposed into radicals under the action of light or which form radicals as a result of reactions, these radicals acting as polymerization initiators. Suitable photoinitiators are for example vicinal ketaldonyl compounds, such as diacetyl and benzil, α-ketaldonyl alcohols, such as benzoin, acyloin ethers, such as benzoinmethyl ether and α-substituted aromatic aceloyl compounds, such as α-methylbenzoin, aromatic ketones and aldehydes, such as benzophenone, propiophenone or benzaldehyde. Such photoinitiators are generally added in amounts of 0.001 to 10% by weight, and preferably from 0.01 to 3% by weight, based on the amount of monomers.

With these new processes the customary inorganic sensitizing agents (as described in detail in the book of J. Kosar, "Light Sensitive Systems," John Wiley, New York, N.Y., U.S.A., 1965) may be used. Suitable compounds are for example heavy metal salts, e.g. iron, cobalt, nickel, mercury, zinc, titanium, tin, cadmium, lead, thallium, silver, gold and uranyl compounds; oxides of zinc and titanium, and salts of tin, such as tin(II) chloride, fluoride, bromide, iodide, sulfate, acetate, adipate, cinnamate, benzoate, acrylate, octoate and furthermore the difficultly soluble tin(II) hydroxides; lead tetraethyl and thallium nitrate as well as the sulfides and oxylates of zinc, strontium and silver, and the oxalates of cadmium and mercury. Particularly suitable are the uranyl salts, such as uranyl nitrate and uranyl salts of organic acids, such as uranyl acetate. The salts of iron, cobalt or of nickel can be used as such. The combination of metal ions with variable valencies with peroxides, such as hydrogen peroxide, persulfates and organic peroxy compounds is particularly advantageous. Complex salts can also be used with advantage, such as iron(III) ammonium citrate, tartrate or oxalate. The amounts of inorganic sensitizing agents can in general be between 0.01 and 1, and preferably between 0.1 and 0.2% by weight, based on the total amount of solvents. In addition to the inorganic sentizing agents of the type cited organic sensitizing agents of the type mentioned above can also be used. Furthermore, it is frequently advantageous to use in addition to the inorganic sensitizing agents, peroxides, in particular hydrogen peroxide or persulfates, such as potassium persulfate, the amount of such peroxides being between 100 and 500% by weight, based on the amount of inorganic sensitizing agents or photoinitiators.

In addition to the photoinitiators the solutions, emulsions and/or dispersions of the monomers can with advantage contain polymers, in particular polymeric synthetic resins in solution or in the form of a dispersion.

Suitable high polymeric synthetic resins, which generally have a molecular weight greater than 10,000, are all synthetic high polymers obtained by conventional polymerization and polycondensation processes, which are soluble or dispersible in the solvents used in the new process or which can if desired, be present in a dispersed state, as when the polymers are obtained by an emulsion polymerization process. Suitable compounds are for example homo- and/or copolymers of mono- and/or diolefinically unsaturated monomers, e.g. of mono- or diolefins with preferably 2 to 5 C atoms, such as ethylene, propylene, isobutylene, butadiene, chloroprene and isoprene, of α,β-ethylenically unsaturated mono- and dicarboxylic acids, in particular with 3 to 5 C atoms, such as acrylic acid, methacrylic acid, maleic acid and itaconic acid and/ or amides or substituted amides, nitriles and/or esters thereof, in particular those of alkanols containing 1 to 8 C atoms, such as the methyl, ethyl, propyl, n-butyl, tertbutyl, n-hexyl and 2-ethylhexyl esters of acrylic and methacrylic acids and diethyl and di-n-butyl-maleate and acrylamide, methacrylamide, N-methylol methacrylamide and N - n - butoxymethyl acrylamide, acrylonitrile and methacrylonitrile, of vinylaromatic monomers, such as styrene, α-methylstyrene, divinylbenzene and vinyltoluenes which in general contain only 1 benzene nucleus, of vinyl esters of saturated monocarboxylic acids which in general contain from 3 to 12 C atoms, in particular vinyl acetate, vinyl propionate, vinyl butyrate and vinyl laurate, of vinyl halides, in particular vinyl chloride, vinylidene chloride and vinyl fluoride, of vinyl ethers, in particular alkanols containing 1 to 4 C atoms, such as vinyl methyl ether and vinyl isobutyl ether, of heterocyclic vinyl compounds, such as vinyl pyridines, N-vinyl pyrrolidone and N-vinylimidazolium salts, e.g. N-vinyl-N-methylimidazolium chloride and N-vinyl-N-methylimidazolium methosulfate. Suitable high polymeric synthetic resins are in addition for example the saturated polyesters manufactured in conventional manner, and in particular polyethyleneglycol terephthalate, polyurethane, and in particular the polycondensation products of hexamethylene diisocyanate and alkanediols, such as glycol and 1,6-hexanediol, synthetic polyamides with recurring units of the general formula —CONH— in the chain molecule, such as poly-ε-caprolactam, polylaurolactam and polycondensation products of aliphatic dicarboxylic acids, such as adipic acid or suberic acid and of aliphatic diamines, such as hexamethylene diamine, decamethylene diamine and 4,4'-diamino-dicyclohexylmethane, polyvinyl alcohols and modified products thereof, polyalkylene oxides, such as polyethylene oxides and polypropylene oxides, in particular with a degree of polycondensation greater than 10, polyacetals, such as polyformaldehyde, furthermore polycarbonates, polyureas, cellulose esters and ethers, in particular cellulose acetate and also polyimides, such as polyethylene imine.

The polymers and polycondensation products of the type mentioned can be manufactured in customary manner and they may be used in solution or in dispersion. Solution or emulsion polymers, e.g. in the form in which they are obtained in solution or dispersion polymerization, can be used with advantage. Solutions or dispersions can also be used which are prepared from the polymers or polycondensation products, e.g. from polyethylene, synthetic polyamides, polyalkylene oxides or polyformaldehyde. In the preparation of synthetic resin dispersions by emulsion polymerization or by so-called secondary dispersions, emulsifying agents or protective colloids can also be added, for example as described fully in Houben-Weyl, Methoden der organischen Chemie, XIV/1, Makromoleculare Stoffe, Georg Thieme Verlag, Stuttgart, 1967, in particular on pages 192 to 208. Of particular interest are additives of those synthetic resin dispersions which are used as bonding agents, in particular as bonding agents for nonwoven fabrics, e.g. those based on copolymers of acrylic and methacrylic acid esters, butadiene and vinyl esters.

Of particular interest are furthermore additives which are solutions and dispersions of vinyl chloride homopolymers and copolymers, styrene homopolymers and copolymers, polyisobutylene, synthetic polyamides, polyurethanes, polyvinyl pyrrolidone, polyacrylic acid and copolymers of acrylamide and acrylic acid in water or organic solvents, such as glacial acetic acid, dioxane and benzene.

The amount of high polymeric synthetic resin of the kind mentioned above present in the monomer solutions and emulsions or dispersions can vary within very wide limits. It is generally between 0.1 and 50, and preferably between 1 and 30% by weight, based on the monomers. The solutions and dispersions of the synthetic resin can be added to the monomer solutions, emulsions or dispersions in general as a 0.1 to 20% solution or a 30 to 60% dispersion (in weight percent, based on the synthetic resin solutions or dispersions). When polymeric resins in solution or in the form of a dispersion are added, the data given for the monomer concentrations in the mixtures containing the monomers, solvents and synthetic resins refer to the total content of the mixture.

The solutions and emulsions or dispersions of the monomers are then solidified or partially solidified in crystalline form. This can be effected for example by using a cold base, such as a cold endless belt or a cooling roller, or on the cold surfaces of molds or on premolded form to be fiber-coated, such as plastic sheets, textiles and leather articles, and if desired by cooling both surfaces of these structures, in particular when they are laminar structures. Non-woven fabrics made of natural or synthetic organic or inorganic fibers can with advantage be soaked in or impregnated with these solutions and the solutions and emulsions or dispersions solidified or partially solidified in partially crystalline form. In this manner generally more than 50 and preferably more than 60% by weight of the monomer solutions, emulsions and/or dispersions are solidified in crystalline form.

According to another embodiment of the new process, cooling can be effected between two cooled endless metal belts or two cooling rollers or in a particularly advantageous manner in a cooled gap. The distance between the cooling surfaces of more than 5 cm. Generally speaking cooling bands or cooling rollers and furthermore the space between the cooling surfaces of the cooling gap is generally less than 5 cm. In some cases it is advantageous for the process to be effected with a distance between the cooling surfaces of more than 5 cm. Generally speaking the distance between the cooling surfaces is from 0.5 to 10 mm., and in particular between 1 and 5 mm. Preferably the cooling areas have surfaces with bad wetting properties, in particular when using two or more cooling rollers or cooling gaps. When using cooling gaps, the length of the latter can vary within wide limits.

The solutions or emulsions, and the forms impregnated with the latter are advantageously present in the form of flat structures, generally as broad bands, with a width generally between 0.1 and 3 m. and a thickness generally between 0.5 and 20 mm. in particular between 1 and 10 mm. In some cases it is advantageous for the solutions or emulsions of the monomers or the woven or non-woven fabrics impregnated with the latter to be conveyed for cooling and irradiation treatment through a flat or flattened tubular sheeting, made for example from polyethylene. In this case the cooling can be effected in a particularly simple manner in a cooling bath. The process can be carried out continuously or in batchwise manner.

The solutions and emulsions or dispersions solidified or partially solidified in crystalline form are then subjected to irradiation. Preferably lamps providing energy-rich light, in particular light with a wavelength of 200 to 500 m$\mu$ are used, e.g. carbon arc lamps, mercury-vapor lamps, xenon lamps or fluorescent strip lamps. Daylight and sunlight can also be used. In addition ionizing radiation is also suitable, e.g. electron beams, X-rays, as well as mixed rays, as emitted by radioactive materials, e.g. by nuclear fuel elements. The duration of the radiation can vary within wide limits. It is all the shorter, the higher the energy level of the radiation and the higher the radiation density. In some cases several seconds of irradiation are sufficient, e.g. when using electron beams with a high radiation density. In some instances radiation times of several minutes are necessary, e.g. when sun rays are used for the irradiation. When using rays with a high energy level, e.g. electron beams or quartz-UV rays, photoinitiators need not be present. In contrast to this photoinitiators are needed when radiation is effected with longer wavelength light in the visible and near-ultraviolet range of the spectrum, in conformity with the absorption of the materials to be polymerized.

The monomers are polymerized as a result of the irradiation. Monomer conversion in the polymerization is between 50 and 80% or higher. After the polymerization the solvents and any residual monomers are separated from the fibrous polymers or poromeric materials obtained, and they can be reused. To effect this the reaction products can for example be heated, to melt the crystallized solvents and the latter can then be removed for example by filtration, centrifuging and/or evaporation. The separation of the solvents can also be effected under reduced pressure.

In the hitherto known process for the production of polymers from monomers containing at least two polymerizable double bonds, in general extremely brittle materials were obtained with glass-like properties, which easily disintegrated or which were in powder form, unless considerable amounts of monoethylenically unsaturated monomers were added. Such polymers could only be used in special technical fields, e.g. as ion exchange materials. The production of fibers from such polymers was not possible. In contrast to this it is possible by the process of the present invention to obtain polymers directly in the form of fibers from any desired monomer or mixtures of monomers, if they contain at least 0.01% and in particular, at least 0.5% by weight of monomers with at least two polymerizable double bonds. This opens up a new range of possible applications, e.g. woven and non-woven textile materials, as well as plastic sheets can be coated with fibers on one or both surfaces according to the new process, forming a velvety deposit on the textiles and plastic sheets. If non-woven fabrics, e.g. based on rayon staple fibers, polyamides or polyesters are impregnated in the manner described above and the solution of the monomers in admixture with the non-woven fabric is brought to crystalline solidification and is irradiated, after separating the solvent and excess monomers products are obtained which are velvety and leather-like in their properties, which we call poromeric materials. Such products can be obtained in various colors when "colored monomers" are used for the process.

The products obtained according to the new invention can for example be used as floor coverings, insulating materials for heat insulation especially at high temperatures and as substitutes for leather, and furthermore as coating materials. If monomer mixtures containing a high proportion of monomers with at least two polymerizable double bonds are used, e.g. containing more than 50% by weight thereof, based on the total monomer content, fibrous polymers with particularly good thermal stability are obtained.

Poromeric materials with particularly good fastness to rubbing are obtained according to the new process, for example, when the non-woven textile fabric impregnated with monomer solutions or emulsions and in the form of a flat structure is cooled on both surfaces and/or when as polyethylenically unsaturated monomers unsaturated polyesters are used alone or in admixture and/or high polymeric synthetic resins in solution or in dispersion are used in addition to the monomer solutions or emulsions.

In the examples which follow the parts given are parts by weight. The acid numbers are determined as laid down by DIN 53,402 and the percentages given are by weight

EXAMPLE 1

20 parts bis-N-methylolacrylamide ethylene glycol ether are dissolved in 200 parts glacial acetic acid. The solution is cooled to −25° C., whereupon the mixture is solidified in crystalline form. The solidified solution is irradiated for 2 hours with a commercial mercury high-pressure lamp (125 w.). After thawing out has occurred, the fibrous polymer obtained is separated from the glacial acetic acid by centrifuging, washed with water and dried. Seven parts of a colorless fibrous product is obtained with a softening point above 350° C., which can be used as an insulating packing material.

If bis-N-methylolacrylamide ethylene glycol ether is replaced by the same quantity of 1,4-butanediol diacrylate, but the same operating conditions are used in other respects, 7.5 parts of a colorless fibrous polyer with a softening point of about 350° C. is obtained. The fibers are suitable as materials for heat insulation at elevated temperatures.

EXAMPLE 2

A solution of 300 parts bis-N-methylolacrylamide ethylene glycol ether and 15 parts benzoin methyl ether in 2700 parts glacial acetic acid are poured into a vat cooled to −20° C., which is covered with a non-woven fabric made of rayon staple weighing 50 g./m.$^2$. The solution covers the fabric completely. After the solution has solidified in crystalline form, irradiation is carried out from a distance of 50 cm. by two commercial mercury high-pressure lamps situated in the focal point of a parabolic mirror. This is followed by heating to room temperature, draining off the glacial acetic acid and excess monomers, washing with water and drying. A product with velvety properties is obtained, with the fibrous polymers arranged vertically over the staple fibers of the non-woven fabric.

If in place of the above-mentioned glacial acetic acid solution a solution of 30 parts benzoin methyl ether and 300 parts methylene-bis-acrylamide or 1,4-butanediol diacrylate or m-xylylene-bis-acrylamide or triethylene glycol diacrylate in 2700 parts glacial acetic acid are used under otherwise identical conditions, a velvety material is likewise obtained which is very similar in appearance to the material described above.

In place of the rayon staple non-woven fabric a fiberglass fabric can also be used. A velvety material is also obtained in this instance.

EXAMPLE 3

A non-woven fabric of polyester fibers is steeped in a vat with a soltuion of 100 parts m-xylylene-bis-acrylamide, 100 parts triethylene glycol diacrylate, 100 parts bis-N-methylolacrylamide ethylene glycol ether and 300 parts benzoin methyl ether in 2700 parts glacial acetic acid in such a manner that the fabric is completely covered by the solution. Cooling, irradiation and processing is carried out as described in Example 2. A velvety material is obtained, which is characterized by a high mechanical resistance.

EXAMPLE 4

Rayon staple non-woven fabric is wound around the lamp-chimney made of glass of a dipping lamp arrangement. The non-woven fabric is then immersed in a solution which contains 810 parts glacial acetic acid, 4.5 parts benzoin methyl ether and in addition (a) 90 parts of a mixture of equal parts divinylbenzene and bis-N-methylolacrylamide ethylene glycol ether or (b) 90 parts allyl acrylate or (c) 90 parts of a mixture of equal parts 1,4-butanediol diacrylate, m-xylylene diacrylate or (d) 90 parts of a mixture of equal parts 1,4-butanediol diacrylate and acrylamide or (e) a mixture of 45 parts m-xylylene-bis-acrylamide and 19 parts acrylamide.

The solution is cooled to −5 to 0° C., causing the solution to solidify in crystalline form. This is followed by irradiation for 115 minutes with a commercial mercury high-pressure lamp, heating until the glacial acetic acid has melted, draining off any liquid, washing with water and drying. A velvety material with a high thermal stability is obtained, which is suitable for thermal insulation.

A similar material is likewise obtained when using a solution of 16.6 parts m-xylylene-bis-acrylamide and 1.7 parts benzoin methyl ether in 810 parts glacial acetic acid under operating conditions which otherwise are the same as described above.

EXAMPLE 5

Solutions of 45 parts allyl acrylate or 22.5 parts m-xylylene-bis-acrylamide and 2.2 parts benzoin methyl ether in 800 parts dioxane are subjected in the presence of a rayon staple non-woven fabric to crystalline solidification and irradiation in the manner described in Example 4. Poromeric fiber materials with a very pleasant handle are obtained.

EXAMPLE 6

Solutions of (a) 22.5 parts m-xylylene-bis-acrylamide, 10 parts vinyl chloride and 2.25 parts benzoin methyl ether, (b) 4.5 parts bis-N-methylolacrylamide ethylene glycol ether, 72 parts ethylene acrylate and 0.9 part benzoin methyl ether, (c) 4.5 parts bis-N-methylolacrylamide ethylene glycol ether, 45 parts n-butyl acrylate and 0.9 part benzoin methyl ether, (d) and (e) 4.5 parts allyl acrylate or butanediol diacrylate, and 45 parts acrylic acid ethyl ester, and 0.9 part benzoin methyl ester in 800 parts glacial acetic acid are subjected in the presence of a rayon staple non-woven fabric to crystalline solidification and irradiation, as described in Example 4. After removal of the glacial acetic acid and drying, an absorbent fiber material with a handle similar to leather is obtained.

EXAMPLE 7

A solution of 45 parts bis-N-methylolacrylamide ethylene glycol ether, 360 parts n-butyl acrylate and 4.5 parts benzoin methyl ether in glacial acetic acid (2700 parts) is divided into three portions; into one portion (a) there is placed a needleloom non-woven fabric of polyhexamethylene adipamide weighing 80 g./m.$^2$ and this portion is introduced into a vat containing the second portion (b) in which there are placed two non-woven fabrics made of rayon staple, each weighing 50 g./m.², the vat being cooled to a temperature of −20° C. to effect solidification, and this being followed by irradiation for 10 minutes with 8 blacklight lamps (Philips TL 40 W/08). A non-woven fabric made of rayon staple is placed in the third portion of the solution and the temperature is lowered to −20° C. to congeal the solution, whereupon irradiation with a 2 m.e.v. Van de Graaff electron accelerator with a 25 m. radius is carried out. Sheets of fiber materials with a very soft handle and with closely similar appearance and handle are obtained.

EXAMPLE 8

A solution containing (a) 30 parts allyl acrylate, 30 parts bis-N-methylolacrylamide ethylene glycol ether, 240 g. n-butyl acrylate and 6 parts monomers (6 parts 1-amino-2-acetyl-4-acryloylamino-anthraquinone) in 2700 parts glacial acetic acid, or (b) 120 parts vinyl isobutyl ether, 120 parts tert-butyl acrylate, 30 parts bis-N-methylolacrylamide ethylene glycol ether, 30 parts m-xylylene-bis-acrylamide and 6 parts blue-colored monomer (6 parts 1-amino-2-acetyl-4-acryloylamino-anthraquinone) is introduced into a vat cooled to −20° C. into which is placed a non-woven fabric of rayon staple. The non-woven fabric is completely covered by the solution. The latter is solidified and irradiated with a 6 m. radius electron accelerator of 2 m.e.v. Colored sheets of fibrous material with a very pleasant handle and similar in appearance to leather are obtained.

EXAMPLE 9

A solution of 30 parts bis-N-methylol acrylamide ethylene glycol ether, 10 parts allyl acrylate and 1 part benzoin methyl ether in 900 parts glacial acetic acid is placed into a vat cooled to −30° C. which is laid out with a non-woven fabric of rayon staple in such a manner that the fabric is covered by the solution. The latter is allowed to solidify in crystalline form, it is again lined with a rayon staple non-woven fabric and a cold solution containing 70 parts n-butyl acrylate, 10 g. ethyl acrylate, 20 parts bis-N-methylol acrylamide ethylene glycol ether and 0.25 part benzoin methyl ether in 900 parts glacial acetic acid is added, so that the second layer of fabric is also covered by the solution. The second layer is similarly allowed to solidify and thereupon a third layer of rayon staple fabric is applied and a cooled solution of 80 parts n-butyl acrylate, 20 parts m-xylylene-bis-acrylamide and 25 parts benzoin methyl ether in 900 parts glacial acetic acid is poured in, so that the fabric is covered by the solution. After this layer has also solidified in crystalline form, it is irradiated for 10 minutes with 8 blacklight fluorescent tubes. There is obtained a multilayer staple fiber sheet which is flexible like leather and has good mechanical properties.

EXAMPLE 10

A solution of 100 parts N-vinyl caprolactam, 100 parts bis-N-methylol acrylamide ethylene glycol ether, 100 parts butanediol monoacrylate and 3 parts benzoin methyl ether in 2700 parts glacial acetic acid or 150 parts tert-butyl acrylate, 150 parts butanediol diacrylate and 1.5 parts benzoin methyl ether in 2700 parts glacial acetic acid are introduced into a vat cooled to −20° C., which is laid out with a needleloom non-woven fabric of rayon staple. The fabric is coated with solution (a) or (b). It is allowed to solidify and irradiated for 10 minutes with 8 blacklight fluorescent tubes. After thawing out, removing the glacial acetic acid and washing with water, a fiber material that is highly resistant to abrasion is obtained.

EXAMPLES 11 TO 20

A needleloom non-woven fabric of cellulose fiber (weight of the fabric is 100 g./m.²), is impregnated with a solution of 0.1 part benzoin methyl ether and solutions of monomers in 100 parts glacial acetic acid in amounts as given in Table 1 which follows. The impregnated fabric is introduced into tubular sheeting of polyethylene and is compressed to a thickness of 0.3 cm. between two metal plates. The compressed article is then cooled for 1 to 2 minutes to −35° C. in a cooling brine. The solution of the monomers thus solidifies in crystalline form. The solidified structure is then taken from the cooling brine, the metal plates are removed and both surfaces of the structure are irradiated for 5 minutes with a Philips blacklight lamp TL 40 W/08. This is followed by thawing out the washing product several times with water and drying. The monomers used and the amounts in which they are used, the polymer yields, and the tensile strength and elongation of the products obtained are summarized in Table 1 below.

TABLE 1

| Example No. | Unsaturated monomers with 2 olefinic double bonds | | Monoolefinic unsaturated comonomers | | Polymer yield in weight percent based on the amount of monomer present | Tensile strength, kg./cm.² | Elongation in percent |
|---|---|---|---|---|---|---|---|
| | Parts | | Parts | | | | |
| 11 | 1.65 | Allyl acrylate | 5 | Ethyl acrylate (I) | | 62.5 | 53 |
| | | | 5 | N-vinyl caprolactam | | | |
| 12 | 1.65 | bis-N-methylol-acrylamide ethylene glycol ether. | 5 | I | | 50.5 | 55 |
| | | | 5 | Vinylthioethanol (II) | | | |
| 13 | 1.65 | Triethylene glycol diacrylate | 5 | I | | 39 | 34 |
| | | | 5 | II | | | |
| 14 | 1.65 | Allyl acrylate | 10 | I | | 42 | 67 |
| | | | 1 | Acrylic acid (III) | | | |
| 15 | 1.65 | bis-N-methylol acrylamide ethylene glycol ether. | 5 | I | | 82 | |
| | | | 5 | II | | | |
| 16 | 1.65 | Triethylene glycol diacrylate | 10 | I | 72 | 55 | 64 |
| | | | 1 | III | | | |
| 17 | 1.65 | do | 2.5 | Vinyl isobutyl ether | 63 | 40 | 65 |
| | | | 2.5 | Maleic anhydride | | | |
| 18 | 3.3 | Allyl acrylate | 10 | Acrylonitrile | 85 | 19 | 83 |
| 19 | 5 | Commercial monomer-free unsaturated polyester LUPODAL P4. | 5 | Butyl acrylate, 3-chloro-2-hydroxy-propyl acrylate. | 60 | 85 | 69 |
| | | | 1.65 | | | | |
| 20 | 1.65 | bis-N-methylol acrylamide ethylene glycol ether. | 6.7 | Methyl acrylate | | 53 | 53 |
| | | | 3.35 | Butanediol monoacrylate | | | |

Note (1).—In example 20 water is used as solvent, the initiator and methyl acrylate are emulsified in the solution.

EXAMPLES 21 TO 26

A needleloom fabric made of cellulose fiber (weighing 100 g./m.²) is placed in a vat that can be cooled and is impregnated with solutions which contain 0.1 part benzoin methyl ether and the unsaturated polyesters and monomers in amounts as specified in the following table in 600 parts glacial acetic acid or ethylene carbonate. The vat is cooled to −35° C. and the surface of the impregnated fabric is irradiated after solidification of the solution for 10 minutes with a Philips blacklight lamp TL 40 W/08. This is followed by thawing out the solidified solution, washing the product several times with water and drying. The composition of the solutions and the yields are summarized in the following table. In all cases fibrous materials with a high tensile strength and excellent fastness to rubbing are obtained, which in addition have good sound-absorbent and heat insulating properties.

4 and from 0.3 part benzoin methyl ether by using 600 parts of the solvents mentioned in Table 4. The solutions

TABLE 2

| No. | Parts | Unsaturated polyesters produced in customary manner from: Parts | Monoolefinically unsaturated monomers Parts | Solvent | Percent yield of polymer with regard to the monomers |
|---|---|---|---|---|---|
| 21 | 20 | 1 Maleic anhydride<br>2 Phthalic anhydride I<br>3 Propylene glycol (Acid No. 30) | 10 Vinyl isobutyl ether<br>20 n-Butyl acrylate | Glacial acetic acid | 66 |
| 22 | 20 | I | 10 Vinyl isobutyl ether<br>40 Ethyl acrylate | do | 67 |
| 23 | 20 | I | 10 Vinyl isobutyl ether<br>n-Butyl acrylate | Ethylene carbonate | 51 |
| 24 | 10<br>10 | 2 Maleic anhydride<br>1 Phthalic anhydride<br>3 Propylene glycol (Acid No. 48)<br>1 Maleic anhydride<br>2.5 Adipic acid<br>1 Phthalic anhydride<br>4.5 Neopentyl glycol (Acid No. 23) | 20 Vinyl isobutyl ether<br>30 n-Butyl acrylate | Glacial acetic acid | 72 |
| 25 | 20 | 1 Maleic anhydride<br>1 Phthalic anhydride<br>2 Adipic acid<br>2 Propylene glycol<br>2.3 Dipropylene glycol (Acid No. 31) | 20 Vinyl isobutyl ether<br>30 n-Butyl acrylate | do | 67 |
| 26 | 25 | I | 10 Chlorhydrin acrylate<br>35 n-Butyl acrylate | do | 70 |

EXAMPLES 27 TO 30

A needleloom fabric made of cellulose fiber (weighing 100 g./m.²) on a cold base is impregnated with a solution of monomers and sensitizing agents in amounts as given in the following table in 600 parts of solvent specified in the following table. The impregnated fabric is cooled on the base to a temperature of −30° C. The solution of the monomers thereupon solidifies in crystalline form. This is followed by irradiation for 5 minutes with a Philips blacklight lamp TL 40 W/08, is allowed to thaw out, and the product is washed several times with water and dried with warm air.

are used to impregnate needle-punched fabrics made of cellulose fibers (weighing 100 g./m.²) and the flat objects obtained are cooled on a cold base to −30° C., the solutions solidifying in crystalline form. These are irradiated with a Philips blacklight lamp TL 40 W/08 for 10 minutes, are allowed to fill out, and the poromeric fabric obtained is washed and dried. Poromeric materials are obtained which have high tensile strength and fastness to rubbing, as well as good thermal and heat insulating properties.

TABLE 4

| No. | Monomers Parts | High molecular weight synthetic resins Parts | Solvent | Yields, percent |
|---|---|---|---|---|
| 31 | 8 bis-N-methylol-acrylamide ethylene glycol ether<br>27 Chlorhydrin acrylate | 1 Polyethylene oxide (K value=210) | Water | 80 |
| 32 | 8 bis-N-methylol acrylamide ethylene glycol ether<br>27 Chlorhydrin acrylate | 1 Polyacrylic acid (K value=170) | do | 89 |
| 33 | 8 bis-N-methylol acrylamide ethylene glycol ether<br>27 Chlorhydrin acrylate | 1 Polyethyleneimine (molecular weight about 3,000) | do | 86 |
| 34 | 5 Triethylene glycol diacrylate<br>27.5 Ethyl acrylate<br>2.5 Acrylic acid | 3 Cellulose acetate (content of acetate groups 53.5% K value=900) | Glacial acetic acid | 72 |
| 35 | 5 Triethylene glycol diacrylate<br>27.5 Ethyl acrylate<br>2.5 Acrylic acid | 1 Polyvinyl chloride (K value=57) | Dioxane | 61 |

EXAMPLES 36 TO 38

The monomers given in Table 5 are dissolved in 600 parts water, the dispersions mentioned in Table 5 are

TABLE 3

| No. | Monomers Parts | Sensitizing agents Parts | Solvent | Yield in weight percent |
|---|---|---|---|---|
| 27 | 25 bis-N-methylol acrylamide ethylene glycol ether<br>45 Acrylamide | 0.7 Uranyl nitrate | Water | 94 |
| 28 | 25 bis-N-methylol acrylamide ethylene glycol ether<br>45 Acrylamide | 0.35 do | do | 63 |
| 29 | 50 N-methylol acrylamide<br>20 bis-N-methylol acrylamide ethylene glycol ether | 0.7 do | do | 40 |
| 30 | 55 Ethyl acrylate<br>5 Acrylic acid<br>10 Triethylene glycol diacrylate | 2.6 Tin (II) acetate | Glacial acetic acid | 53 |

The poromeric materials obtained have excellent thermal insulations and sound absorbent properties.

EXAMPLES 31 TO 35

Solutions are prepared from monomers and high molecular synthetic resins in amounts as given in Table 4 and from 0.3 part benzoin methyl ether are dispersed therein with the aid of an impeller. Non-woven fabrics are saturated with the mixtures, as specified in Examples 31 to 35, and are subjected to further processing as described therein. The yields in polymers in weight percent, based on the monomers used, is given in Table 5 which follows.

is added in amounts as specified in Table 7, for emulsification 0.3 part benzoin methyl ether is added for the

TABLE 5

| No. | Monomers Parts | Dispersion Parts | Yield, percent |
|---|---|---|---|
| 36 | 16 bis-N-methylol acrylamide ethylene glycol ether.<br>30 N-methylol acrylamide. | 15 40% dispersion of a copolymer of 85 parts butyl acrylate, 7 parts acrylic acid and 3 parts butanediol diacrylate N-methylol acrylamide (5%). | 85 |
| 37 | 8 1,4-bis-N-methylol acrylamide butanediol ether.<br>21 Chlorohydrin acrylate. | 11 55% dispersion of a copolymer of 89 parts vinylidene chloride and 11 parts methyl acrylate. | 56 |
| 38 | 8 1,4-bis-N-methylol acrylamide butanediol ether.<br>21 1,4-butanediol monoacrylate. | 12 50% dispersion of polyvinyl propionate. | 43 |

EXAMPLES 39 TO 44

Needlesloom fabrics made of cellulose fiber (weighing 100 g./m.$^2$) are saturated with emulsions of monomer mixtures in amounts as given in the following table in 600 parts water, which contain 0.5 part benzoin methyl ether, and are brought to a temperature of —30° C. on a cold base. Thereupon they are irradiated with a Philips blacklight lamp TL 40 W/08, and this is followed by thawing out and the poromeric material obtained and removed from the cold base is washed and is dried at 25° C. The polymer yields and the monomers and emulsifying agents present in the emulsions, as well as the amounts present are summarized in Table 6 which follows.

The poromeric materials obtained have a soft, leather-like handle, a high absorptive capacity for water and excellent heat and sound insulating properties.

dispersion, as well as the amounts of synthetic resin dispersions as specified in Table 7.

The needlesloom non-woven fabrics made of cellulose fibers (weighing 100 g./m.$^2$) are impregnated with the mixtures obtained. This mass is subjected to crystalline solidification on a cooled belt-type metallic base at a temperature of —30° C. The solidified objects are thereupon subjected to a thawing process and the poromeric materials obtained are separated from the base, washed and dried at 25° C. The polymer yields are given in Table 7. The poromeric materials have a soft, leather-

TABLE 6

| No. | Monomers Parts | Emulsifying agents Parts | Yield in weight percent, based on the monomers |
|---|---|---|---|
| 39 | 10 1,4-butanediol diacrylate<br>30 1,4-butanediol monoacrylate<br>30 Methyl acrylate | 0.5 Sulfonated castor oil | 73 |
| 40 | 10 Allyl acrylate<br>30 1,4-butanediol monoacrylate<br>30 Methyl acrylate | 0.5 Sodium stearate | 49 |
| 41 | 10 Triethylene glycol diacrylate<br>55 Ethyl acrylate<br>5 Acrylic acid | 0.5 Sulfonated castor oil | 87 |
| 42 | 10 1,4-butanediol diacrylate<br>20 1,4-butanediol monoacrylate<br>40 Vinyl propionate | 0.5 ___do___ | 40 |
| 43 | 20 Unsaturated polyester A from 1 part maleic acid, 1 part phthalic acid, 2 parts adipic acid, 2 parts propylene glycol and 2.3 parts dipropylene glycol.<br>30 N-butyl acrylate<br>20 Vinyl isobutyl ether | 0.5 ___do___ | 70 |
| 44 | 20 Unsaturated polyester A<br>30 Vinyl thioethanol<br>30 Ethyl acrylate | 0.5 ___do___ | 84 |

EXAMPLES 45 TO 54

The monomer amounts given in Table 7 which follows are used in 600 parts water, and sulfonated castor oil like handle, a high absorptive capacity for water and excellent heat and sound insulating properties.

TABLE 7

| No. | Monomers Parts | Parts sulfonated castor oil | Synthetic resin dispersion Parts | Yield in weight percent, based on the monomers |
|---|---|---|---|---|
| 45 | 10 Butanediol diacrylate<br>25 Butanediol monoacrylate | 0.5 | 35 50% aqueous dispersion of poly-n-butylacrylate | 69 |
| 46 | 5 Triethylene glycol diacrylate<br>22 Ethyl acrylate<br>15 Acrylic acid | 0.25 | 15 40% aqueous dispersion of a copolymer of 85 parts butyl acrylate, 7 parts acrylic acid, 3 parts 1,3-butanediol diacrylate and 5 parts N-methylol acrylamide. | 89 |
| 47 | 8 1,4-butanediol diacrylate<br>21 1,4-butanediol monoacrylate | 0.25 | 5 ___do___ | 92 |
| 48 | 2 Triethylene glycol diacrylate<br>27 Ethyl acrylate | 0.25 | 55% aqueous dispersion of a copolymer of 89 parts vinylidene chloride and 11 parts methyl acrylate. | 91 |
| 49 | 8 1,4-butanediol diacrylate<br>21 1,4-butanediol monoacrylate | 0.25 | ___do___ | 86 |
| 50 | 8 Butanediol acrylate<br>21 Butanediol monoacrylate | 0.35 | 10 50% aqueous polystyrene dispersion | 50 |
| 51 | 1 Allyl acrylate<br>28 Ethyl acrylate | 0.7 | 10 60% aqueous polystyrene dispersion | 50 |
| 52 | 8 Butanediol diacrylate<br>21 Butanediol monoacrylate | 0.25 | 10 50% aqueous dispersion of polyvinyl propionate | 83 |
| 53 | 3 Allyl acrylate<br>26 Butyl acrylate | 0.35 | 10 50% polyvinyl chloride dispersion | 65 |
| 54 | 6 Triethylene glycol diacrylate<br>23 Ethyl acrylate | 0.35 | 15 40% polyethylene dispersion | 59 |

Similar results are obtained by using in place of benzoin methyl ether as sensitizing agent α-methylol benzoin methyl ether, α-methylol benzoin propyl ether, α-methylol benzoin, benzoin propyl ether, benzil, azo-bis-isobutyronitrile, diparatolyl disulfide or diphenyl disulfide.

EXAMPLE 55

One part polyacrylamide (K value in water at 25° C.=170) and 0.15 part sulfonated castor oil are dissolved in 600 parts water and 8 parts 1,4-butanediol diacrylate and 21 parts 1,4-butanediol monoacrylate are emulsified in the solution. 0.3 part benzoin methyl ether is dispersed in the emulsion and this is used to impregnate a needle-loom rayon staple fabric (weight 100 g./m.$^2$). The impregnated fabric is cooled on a belt-type metallic base at a temperature of −30° C. until the emulsion solidifies. This mass is then irradiated for 10 minutes with a Philips blacklight lamp TL 40 W/08, this is followed by thawing out, the poromeric material is removed from the base, washed with water and dried at 25° C. The yield in polymer is 80% by weight, based on the monomers.

EXAMPLES 56 TO 58

The monomers mentioned in Table 8 are emulsified by adding 0.35 part sulfonated castor oil in 600 parts water and the sensitizing agents specified in Table 8 are added thereto. Needle-punched rayon staple fabrics (weight per unit area 100 g./m.$^2$) are impregnated with the mixtures thus obtained and the resulting materials are subjected to further processing as described in Example 55.

The polymer yields obtained, based on the monomers used, are given in Table 8.

TABLE 8

| No. | Monomers Parts | | Sensitizing agents Parts | | Yield, weight percent |
|---|---|---|---|---|---|
| 56 | 1 | Allyl acrylate | 0.35 | Thallium nitrate | 25 |
|  | 28 | Ethyl acrylate |  |  |  |
| 57 | 1 | Allyl acrylate | 0.35 | Zinc oxide | 35 |
|  | 28 | Ethyl acrylate |  |  |  |
| 58 | 1 | Allyl acrylate | 0.175 | Potassium ferric oxalate. | 80 |
|  | 28 | n-Butylacrylate | 0.7 | Cumene hydroperoxide. |  |

We claim:
1. A process for the production of polymers having a fibrous poromeric structure which comprises:
   (a) dispersing ethylenically unsaturated monomers in a liquid which undergoes crystalline solidification at at temperature between −100 and +100° C., at least 0.01% by weight of said ethylenically unsaturated monomers containing 2 or more polymerizable double bonds, said monomers containing 2 or more polymerizable double bonds being selected from the group consisting of polyethylenically unsaturated carboxylic esters, polyethylenically unsaturated acid amides, polyethylenically unsaturated ethers, polyethylenically unsaturated amines and polyethylenically unsaturated polyesters;
   (b) cooling said liquid sufficiently to crystallize at least 50% of said liquid, said liquid containing said dispersed monomers being arranged so that on cooling a frozen band of said liquid is formed having a thickness between 0.5 and 20 mm.;
   (c) irradiating said frozen band by high-energy light or ionizing radiation until the monomers are polymerized;
   (d) thawing said frozen band; and
   (e) separating the resultant polymers having a poromeric fibrous structure from said liquid.

2. A process as claimed in claim 1, wherein the frozen structure is irradiated by light with a wavelength of 200 to 500 mμ.

3. A process as claimed in claim 1, wherein water is used as the said liquid.

4. A process as in claim 1, wherein the said monomers contain at least 0.5% by weight of said monomers with at least two polymerizable double bonds.

5. A process as in claim 1, wherein the said monomers contain at least 5% by weight of said monomers with at least two polymerizable double bonds.

6. A process as in claim 1 wherein said liquid undergoes crystalline solidification at a temperature between −25 and +25° C.

7. A process as in claim 1 wherein said band has a thickness of from 1 to 10 m.

8. A process as in claim 1 wherein said ethylenically unsaturated monomers include monoethylenically unsaturated monomers selected from the group consisting of acrylic esters, methacrylic esters, acrylamides and methacrylamides.

9. A process as in claim 1 wherein said monomers containing 2 or more polymerizable double bonds are selected from the group consisting of diesters of diols with 2 to 10 carbon atoms with acrylic acid, diesters of diols with 2 to 10 carbon atoms with methacrylic acid, and allyl esters of saturated or monoolefinically unsaturated dicarboxylic acids containing 3 to 8 carbon atoms.

10. A process as in claim 1 wherein said monomers containing 2 or more polymerizable double bonds are selected from the group consisting of diacrylic or dimethacrylic esters of diols having from 2 to 10 carbon atoms, and allyl acrylate.

11. A process as in claim 9 wherein said ethylenically unsaturated monomers include monoethylenically unsaturated monomers selected from the group consisting of acrylic or methacrylic esters of alkanols having from 1 to 8 carbon atoms, monoacrylic or monomethacrylic esters of diols having from 2 to 6 carbon atoms, and said esters wherein the alcohol residue in the ester contains a dialkylamino group.

References Cited
UNITED STATES PATENTS

| 3,422,074 | 1/1969 | Ishida et al. | 204—159.21 |
| 3,313,752 | 4/1967 | Sack | 204—159.21 |
| 3,224,949 | 12/1965 | Grosmangin et al. | 204—159.22 |
| 3,214,358 | 10/1965 | D'Alelio | 204—159.22 |

MURRAY TILLMAN, Primary Examiner

R. B. TURER, Assistant Examiner

U.S. Cl. X.R.

117—93.31; 204—159.12, 159.23, 159.24; 260—2.5R